UNITED STATES PATENT OFFICE.

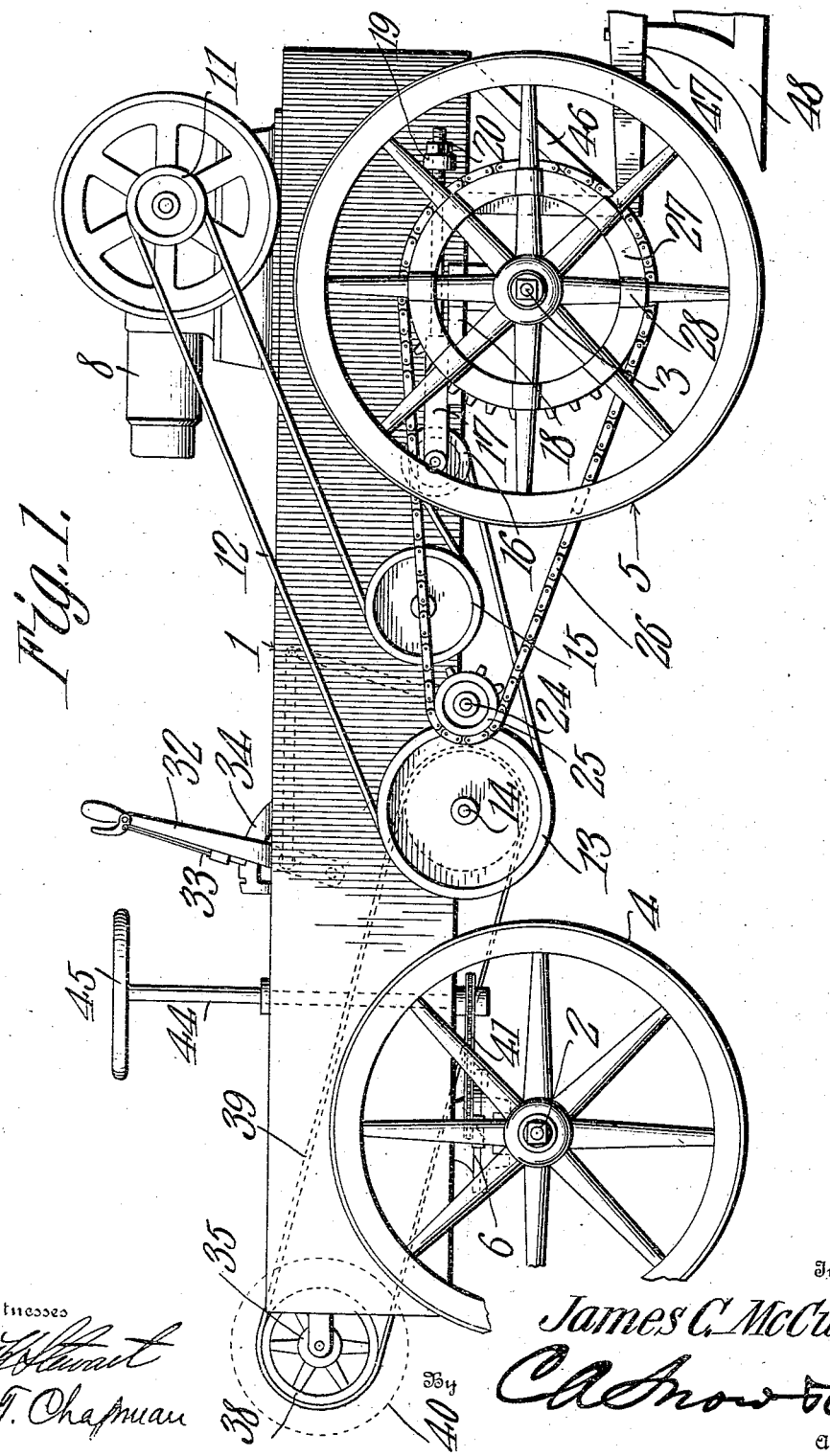

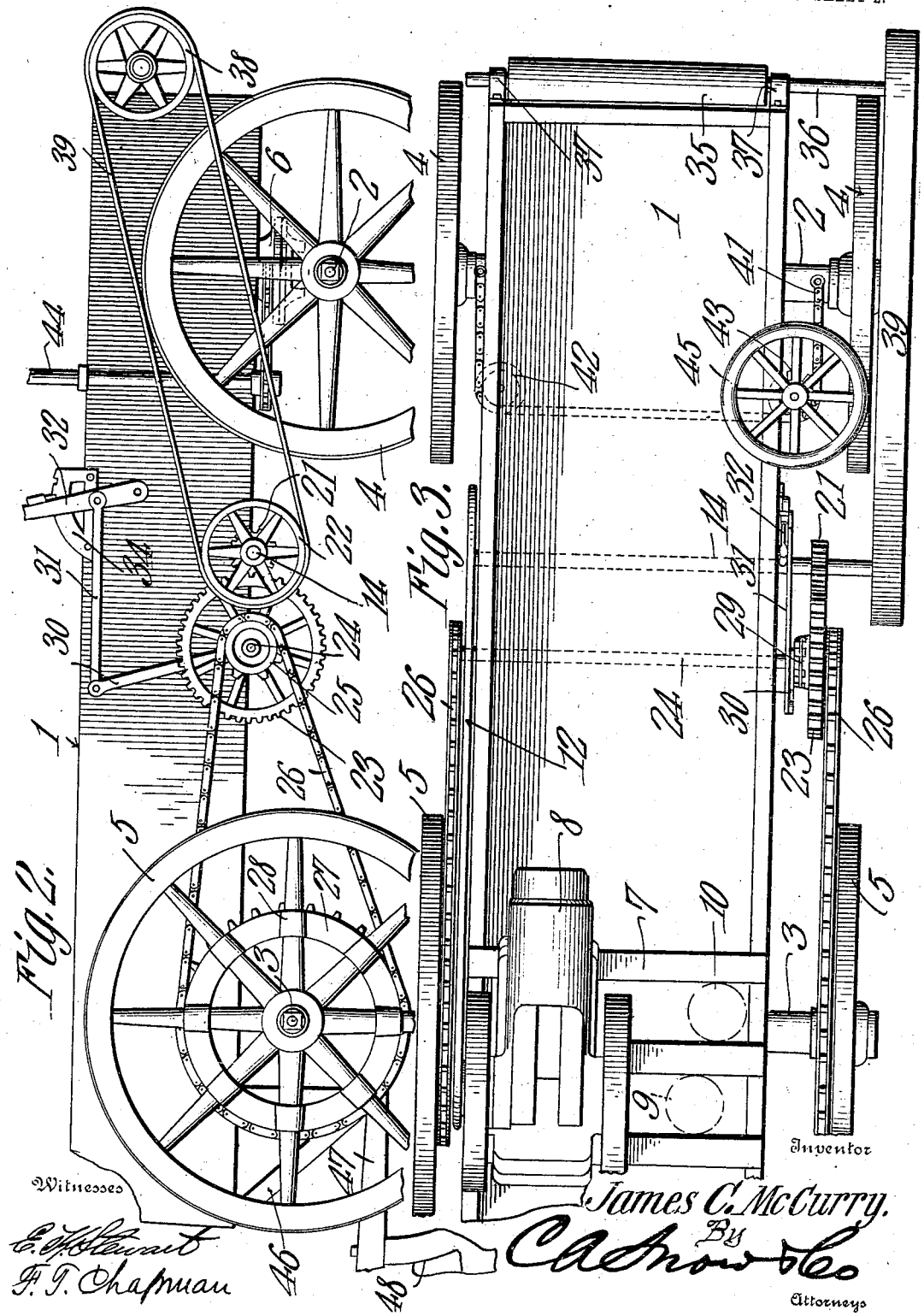

JAMES C. McCURRY, OF TEXARKANA, TEXAS.

MOTOR-VEHICLE.

No. 896,314.   Specification of Letters Patent.   Patented Aug. 18, 1908.

Application filed August 26, 1907. Serial No. 390,196.

*To all whom it may concern:*

Be it known that I, JAMES C. McCURRY, a citizen of the United States, residing at Texarkana, in the county of Bowie and State of Texas, have invented a new and useful Motor-Vehicle, of which the following is a specification.

This invention has reference to improvements in motor vehicles, and its object is to provide a wagon of the ordinary farm type with a motive unit and connections therefrom for propelling the wagon along roads or in any other place where it may be desired to cause the vehicle to travel. There are also provided one or more plows which may be secured to the wagon body, so that the wagon may be used for plowing, instead of horses, while other parts are carried upon the wagon body so that the power, when not being used for propelling the wagon, may be used for other purposes. The various mechanisms are mounted upon the wagon with connections to the source of power, so that by uncoupling the power source from the running gear the other mechanisms may be operated.

The invention will be fully understood from the following detailed description, taken in connection with the accompanying drawings forming part of this specification, in which,—

Figure 1 is a side elevation of the improved motor vehicle; Fig. 2 is a similar view, with parts omitted and other parts broken away, from the other side of the vehicle; and Fig. 3 is a plan view of the improved motor vehicle.

Referring to the drawings, there is shown a wagon body 1, which may be of the ordinary box type, and this body is provided with the usual front axle 2 and rear axle 3 carrying front wheels 4 and rear wheels 5, respectively. The front axle 2 is connected to the body through the usual fifth wheel 6. At the rear of the wagon body there are provided cross timbers 7 upon which is mounted an explosive engine 8 of any suitable type, preferably a gasolene engine, and adjacent to the engine is a water tank 9 and a gasolene tank 10, both of which are suitably coupled up to the engine, one to the water jacket and the other to the fuel feeding mechanism, in the usual way but for the sake of simplicity these common connections are not shown in the drawings.

The engine shaft carries a pulley 11 over which passes a belt 12 passing over another pulley 13 upon a shaft 14 running under the wagon body from side to side and between the front and rear wheels of the wagon. Between the pulley 13 and the engine there is fast upon the wagon body another pulley 15, and to the rear of this last-named pulley is still another pulley 16 upon one end of a rod 17 supported by and moving longitudinally on the ledge 18 and ultimately passing through a lug 19 on the wagon body. Where the rod passes through the lug 19 it is screw-threaded and a nut 20 upon the threaded end of the rod engages behind the lug 19 so that the rod may be moved in a longitudinal direction toward the rear of the wagon body. The belt 12, after passing around the pulley 13, is passed under and over the pulley 16, thence returning under and over the pulley 15 back to the engine. Now, when the nut 20 is screwed in a direction to pull the rod 17 toward the rear of the wagon the belt is tightened about the several pulleys and power is transmitted without slippage from the engine pulley 11 to the main drive pulley 13. The shaft 14 extends across under the wagon body, being supported in suitable journal bearings, and at the other end beyond the wagon body carries a gear pinion 21 and beyond the gear pinion 21 the shaft is provided with a pulley 22. The gear pinion 21 meshes with a gear wheel 23 upon another shaft 24 extending under the wagon body parallel to the shaft 14 but located nearer the rear end of the wagon body than is the shaft 14. At each end of the shaft 24 there is a sprocket pinion 25 from which extends a sprocket chain 26 to a sprocket wheel 27 upon each rear wheel 5. This sprocket wheel consists of an annulus having peripheral teeth to engage the sprocket chain, and secured to the spokes of the wheel are clips 28, so that the sprocket wheel or annulus may be fastened to an ordinary wagon wheel, the clips 28 being properly shaped for this purpose. The gear wheel 23 is mounted loosely upon the shaft 24 and a clutch 29 is provided for coupling the gear wheel 23 to the shaft 24. This clutch is under the control of a lever 30 connected by a link 31 to a hand lever 32 pivotally secured to one side of the wagon body, and this hand lever 32 is provided with a thumb catch mechanism 33 arranged to engage in a segmental rack bar 34 fast on the side of the wagon body. This clutch lever 32 is located near the front of the wagon body, adjacent to the steering means which will hereinafter be described. The clutch lever 32 provides a means whereby the engine may be coupled up to the rear wheels of the wagon body when it is desired to propel the wagon from place to place, and the engine may be uncoupled from these wheels when it is desired to use the power generated by the engine for some other purpose. Upon the front of the wagon body is mounted a roller 35 upon a shaft 36 journaled in suitable boxes 37, and on the end of this shaft is a pulley 38 which may receive power from the pulley 22 through a belt 39. This roller 35 may be used as a winding drum, or power may be transmitted therefrom to a saw, or a saw may be mounted directly upon the shaft 36 as indicated by the dotted lines at 40.

Fast to each end of the axle 2 near the wheels is a chain 41 passing over a roller 42 at one side of the wagon body and over a sprocket pinion 43 at the other side of the wagon body. The sprocket pinion 43 is fast on the lower end of a shaft 44 extending upward alongside of the wagon body and provided above the same with a hand wheel 45. When the engine is driving the vehicle over the ground the hand wheel 45 may be so manipulated as to move the front wheels about the fifth wheel as an axis and thus the wagon may be steered.

At the rear of the wagon there depends a braced frame 46 to which is connected a plow-beam 47 carrying a plowshare 48. While not so shown in the drawings, it will be understood that the plow may be provided with suitable handles so that it may be properly manipulated when dragged along over the ground by the motor wagon. Or more than one plow may be used since the motor wagon may develop ample power to propel a gang of plows.

When it is desirable to run the wagon upon a road the plow 48 is either removed from the wagon or lifted so as to be out of operative relation to the ground and then when the engine is started the clutch 29 is thrown into action, thus coupling the engine to the rear wheels and the wagon is propelled in the usual manner. When plowing is to be done the plow or plows are lowered into the ground and the wagon then acts as the propelling means for the plows, taking the place of horses. When it is desired to use the power for other purposes upon the wagon the clutch coupling the power to the drive wheels is thrown out of action and then the power may be used for whatever purpose desired.

I claim:—

1. A motor vehicle comprising a wagon having a box body, a fixed rear axle, and wheels mounted thereon, a movable front axle and wheels mounted thereon, an explosive engine mounted upon the rear end of the wagon body above the same and having the engine shaft projecting beyond the corresponding side of the wagon body, connections exterior to the wagon body from the engine shaft to the rear wheels for driving the latter, and steering means also exterior to the wagon body and connected to the front axle.

2. A motor vehicle comprising a wagon having a box body, a fixed rear axle, and wheels mounted thereon, a movable front axle and wheels mounted thereon, an explosive engine mounted upon the rear end of the wagon body above the same and having the engine shaft projecting beyond the corresponding side of the wagon body, connections exterior to the wagon body from the engine shaft to the rear wheels for driving the latter, steering means comprising a vertical shaft exterior to and journaled on one side of the wagon body and projecting beyond the upper edge thereof, and connections between said shaft and the front axle on each side of its center.

3. A motor vehicle comprising a wagon having a box body, a fixed rear axle, and wheels mounted thereon, a movable front axle and wheels mounted thereon, an explosive engine mounted upon the rear end of the wagon body above the same and having the engine shaft projecting beyond the corresponding side of the wagon body, connections exterior to the wagon body from the engine shaft to the rear wheels for driving the latter, steering means comprising a vertical shaft exterior to and journaled on one side of the wagon body and projecting above the upper edge thereon, connections between said shaft and the front axle on each side of its center, and means for controlling the application of power from the engine to the rear wheels comprising a clutch interposed in the driving means, and a lever and connections therefrom on one side of and exterior to the wagon body, said lever projecting above the upper edge of the wagon body.

In testimony that I claim the foregoing as my own, I have hereto affixed my signature in the presence of two witnesses.

JAMES C. McCURRY.

Witnesses:
E. E. BRAMLETTE,
M. BRADY.